United States Patent
Cannings et al.

(10) Patent No.: US 8,505,102 B1
(45) Date of Patent: Aug. 6, 2013

(54) DETECTING UNDESIRABLE CONTENT

(71) Applicants: Richard Cannings, Santa Cruz, CA (US); Kenneth Root, Menlo Park, CA (US); Sebastian Johannes Porst, San Francisco, CA (US); Curtis Gerald Condra, Santa Clara, CA (US); Nicholas Neil Kralevich, IV, Sunnyvale, CA (US); Adrian Ludwig, Atherton, CA (US); Peter Valchev, Mountain View, CA (US)

(72) Inventors: Richard Cannings, Santa Cruz, CA (US); Kenneth Root, Menlo Park, CA (US); Sebastian Johannes Porst, San Francisco, CA (US); Curtis Gerald Condra, Santa Clara, CA (US); Nicholas Neil Kralevich, IV, Sunnyvale, CA (US); Adrian Ludwig, Atherton, CA (US); Peter Valchev, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/740,701

(22) Filed: Jan. 14, 2013

(51) Int. Cl.
*G06F 11/00* (2006.01)
(52) U.S. Cl.
USPC .................. 726/24; 726/22; 726/23; 713/187; 713/188
(58) Field of Classification Search
USPC .......................... 726/22, 23, 24; 713/187, 188
See application file for complete search history.

(56) References Cited

U.S. PATENT DOCUMENTS

2011/0047620 A1 2/2011 Mahaffey et al.
2011/0167474 A1 7/2011 Sinha et al.

OTHER PUBLICATIONS

Schmidt, Aubrey-Derrick, "Detection of Smartphone Malware," Dissertation for Ph.D., Technischen Universitat Berlin, Jun. 28, 2011.
Schmidt, Matthias, et al., "Malware Detection and Kernel Rootkit Prevention in Cloud Computing Environments", Department of Mathematics and Computer Science, University of Marburg, Germany. No date given.
Oberheide, Jonathon Clarke, "Leveraging the Cloud for Software Security Services," Dissertation for Ph.D. in Computer Science and Engineering, The University of Michigan, 2012.

*Primary Examiner* — Christopher Brown
(74) *Attorney, Agent, or Firm* — Morris & Kamlay LLP

(57) ABSTRACT

Systems, methods, routines and/or techniques for time delay on services (e.g., verification services) that detect undesirable content are described. In some embodiments, a flexible verification service prevents users (e.g., hackers) from using the verification service "as an oracle" to predict whether the user's application or software program will be detected by the verification service. The verification service, after receiving a verification request from a client device, may delay or prevent the communication of a verification response to the client device. The verification service may evaluate a verification request to determine a level of risk associated with the request. The verification service may communicate an initial response to the client device that submitted the verification request. The verification service may eventually communicate the verification response to the client device, for example, after a period of delay.

23 Claims, 5 Drawing Sheets

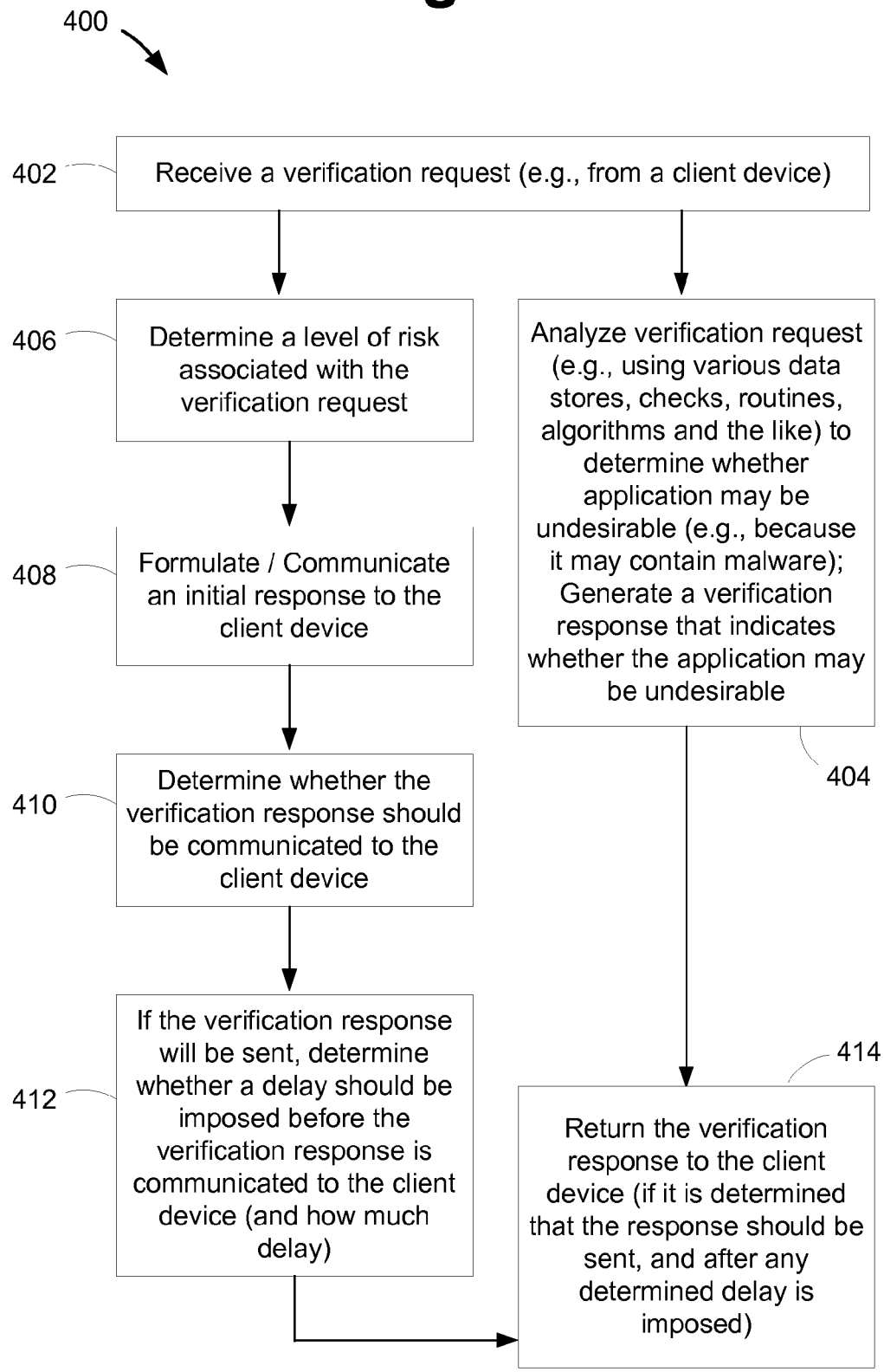

DETECTING UNDESIRABLE CONTENT

FIELD

The present disclosure relates to protecting users from undesirable content, for example, malware and/or other undesirable applications and/or software programs, and more particularly to one or more systems, methods, routines and/or techniques to for time delay on services that detect undesirable content.

BACKGROUND

Computers and some mobile devices are capable of downloading, via the internet, software programs, executables, applications and the like from servers (e.g., application servers). In some situations, these software programs, executables, applications and the like may be dangerous to a user or undesirable for various reasons, for example, because they may contain malicious code and/or may operate in a manner that attempts to trick the user. Some services (e.g., anti-virus services) are designed to detect various software programs, executable, applications and the like that may contain malicious code. Some of these services may be designed to run on the computer or mobile device (e.g., the client device) that runs the software program, executable, application and the like. Some of these services may be designed to run on a remote server (or in the "cloud"), and the client device may communicate via the internet with the remote server.

Further limitations and disadvantages of conventional and traditional approaches will become apparent to one of skill in the art, through comparison of such systems with some aspects of the present disclosure as set forth in the remainder of the present application and with reference to the drawings.

SUMMARY

The present disclosure describes one or more systems, methods, routines and/or techniques for time delay on services (e.g., verification services) that detect undesirable content. One or more systems, methods, routines and/or techniques may provide a flexible verification service that prevents users (e.g., hackers) from using the verification service "as an oracle" to predict whether the user's application or software program (e.g., which may include malware or be otherwise undesirable) will be detected by the verification service. The verification service, after receiving a verification request from a client device, may delay or prevent the communication of a verification response to the client device. The verification service may evaluate a verification request to determine a level of risk associated with the request. The verification service may communicate an initial response to the client device that submitted the verification request. The initial response may vary depending on the risk evaluation and, optionally, other factors. The verification service may eventually communicate the verification response to the client device, for example, after a period of delay. The period of delay (or whether the verification response is sent at all) may depend on the on the risk evaluation, and optionally, other factors.

These and other advantages, aspects and novel features of the present disclosure, as well as details of an illustrated embodiment thereof, will be more fully understood from the following description and drawings. It is to be understood that the foregoing general descriptions are examples and explanatory only and are not restrictive of the disclosure as claimed.

BRIEF DESCRIPTION OF THE DRAWINGS

Several features and advantages are described in the following disclosure, in which several embodiments are explained, using the following drawings as examples.

FIG. 4 depicts a flow diagram that shows example steps in a method for time delay on services that detect undesirable content, in accordance with one or more embodiments of the present disclosure.

DETAILED DESCRIPTION

Figure 1:
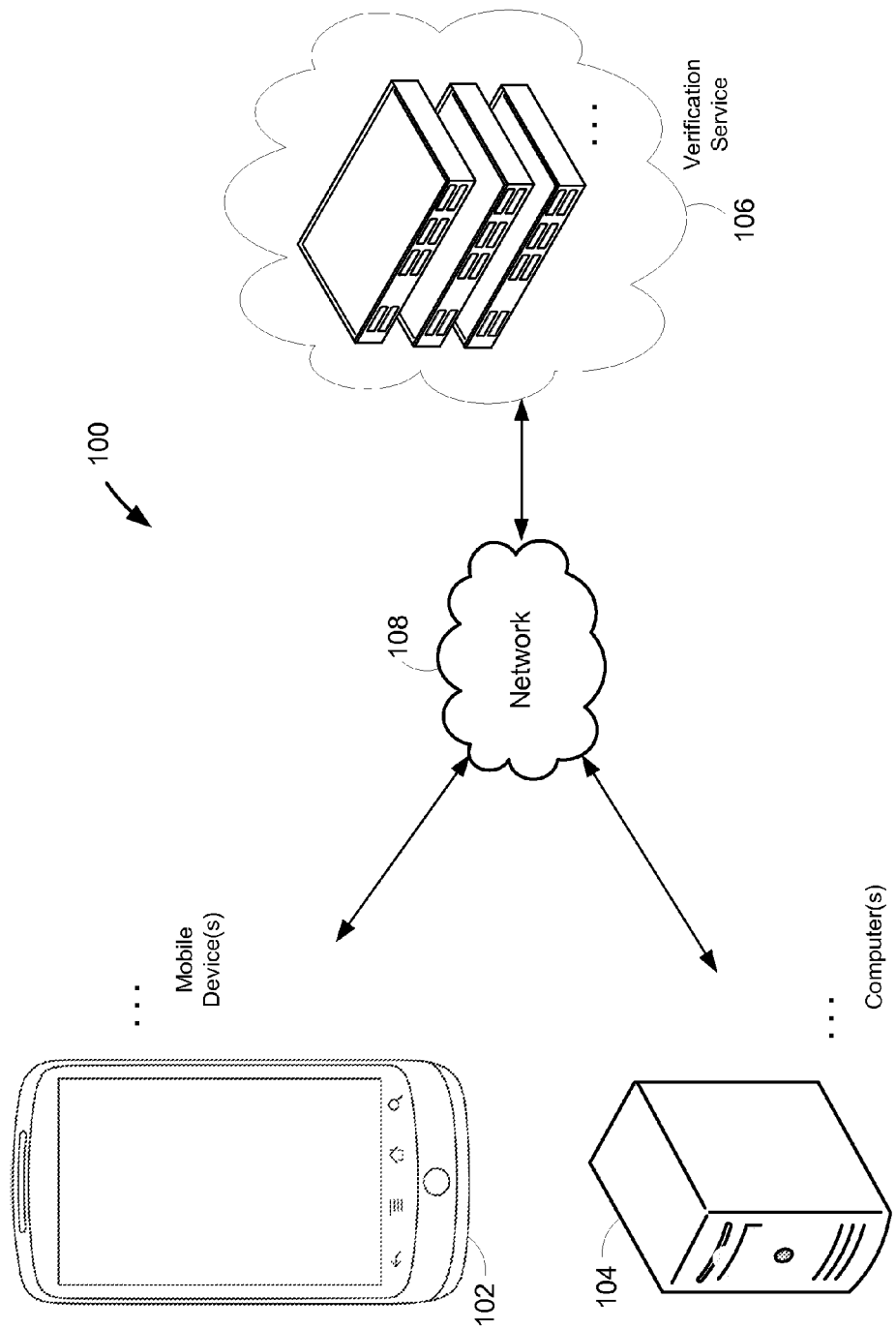
FIG. 1 depicts an illustration of a block diagram showing example components, connections and interactions of a network setup, where one or more embodiments of the present disclosure may be useful in such a network setup.

Various verification services (e.g., malware or anti-virus scanning services) may run on one or more remote servers (or in the "cloud") and various client devices (e.g., computers, mobile devices, etc.) may communicate via a network (e.g., the internet) with the remote server(s). Various verification services may be accessible to the public. For example, various verification services may allow a user to submit information about a software program, application or the like, and the verification service may return a verification response, for example, an indication of whether the software program, application or the like may contain malware or may be otherwise undesirable. Such verification services may be useful to innocent users of computers and/or mobile devices, for example, innocent users who may want to know whether a software program or application contains malware before they install it and use it on their personal computer or mobile device. Unfortunately, misguided individuals may attempt to use such verification services to aid in creating new malware, for example, malware that may avoid detection by current verification and/or scanning methods. In other words, it may be said that a hacker attempts to use a verification service "as an oracle." For example, malware creators (e.g., hackers) may design an application that contains malware, and they may submit the application to a publicly available verification service to determine whether the verification service can detect the malware. If, for example, the verification service detects the malware, the hacker may slightly alter the malware code and then resubmit the application to the verification service to see if the alteration caused the malware to avoid detection. In some situations, a hacker may perform this cycle of alteration and resubmitting several times, perhaps for several applications and several types of malware. In some situations the hacker may perform similar cycles over and over in a methodical way in an attempt to learn the rules, routines, data and the like used by a verification service.

The present disclosure describes one or more systems, methods, routines and/or techniques for time delay on services (e.g., verification services) that detect undesirable content. One or more systems, methods, routines and/or techniques may provide a flexible verification service that prevents users (e.g., hackers) from using the verification service "as an oracle" to predict whether the user's application or software program (e.g., which may include malware or be otherwise undesirable) will be detected by the verification service. The verification service, after receiving a verification request from a client device, may delay or prevent the communication of a verification response to the client device. The verification service may evaluate a verification request to determine a level of risk associated with the request. The verification service may communicate an initial response to the client device that submitted the verification request. The initial response may vary depending on the risk evaluation and, optionally, other factors. The verification service may eventually communicate the verification response to the client device, for example, after a period of delay. The period of delay (or whether the verification response is sent at all) may depend on the on the risk evaluation and, optionally, other factors.

The term malware stands for malicious software and may refer to any software or code within a software program, application and the like that operates to, without a user's conscious consent, infiltrate, damage, monitor (or other malicious action) a computing device (e.g., a personal computer or mobile device). Examples of malware include viruses, spyware, clickbots, phishing attempts, fraudware, Trojan horses, rooting attempts or any other malicious software and/or code. Although the present disclosure may describe one or more systems, methods, routines and/or techniques to protect users from malware, it should be understood that the various systems, methods, routines and/or techniques described herein may also be used to protect users from other types of undesirable applications and/or undesirable content. As one example of an undesirable application that may not technically be thought of as malware, a software program or application may be pirated or counterfeited. Although such an application may not be harmful to a user's device, it may be harmful to the real and original developer or author of the application. As another example of an undesirable application that may not technically be thought of as malware, a software program or application may run or execute in a manner that drains the battery of a mobile device faster than a user would expect. In various embodiments of the present disclosure, if these and other types of undesirable applications are noted, tracked and/or accounted for in a verification service, the descriptions provided herein may apply likewise to these types of undesirable applications. Therefore, the use of the term "malware" throughout this disclosure should not be understood to limit the related descriptions and/or embodiments.

FIG. 1 depicts an illustration of a block diagram showing example components, connections and interactions of a network setup 100, where one or more embodiments of the present disclosure may be useful in such a network setup. It should be understood that the network setup 100 may include additional or fewer components, connections and interactions than are shown in FIG. 1. FIG. 1 focuses on a portion of what may be a much larger network of components, connections and interactions. Network setup 100 may include one or more client devices, for example, one or more mobile devices (e.g., mobile device 102) and/or one or more computers (e.g., personal computer 104). Network setup 100 may include a verification service 106, where the verification service may include various computers, servers, routers, switches, connections and other circuitry, devices and the like. Network setup 100 may include a network, for example, network 108. Various client devices (e.g., client devices 102, 104) may be connected to a verification service 106 via a network 108. Network 108 may be a medium used to provide communication links between various devices, such as data processing systems, computers, servers, mobile devices and perhaps other devices. Network 108 may include connections such as wireless or wired communication links. In some examples, network 108 may represent a worldwide collection of networks and gateways that use the Transmission Control Protocol Internet Protocol (TCP IP) suite of protocols to communicate with one another. In some examples, network 108 may include or be part of an intranet, a local area network (LAN) or a wide area network (WAN). In some examples, network 108 may be part of the internet.

Network setup 100 may include one or more client devices, for example, one or more mobile devices (e.g., mobile device 102) and/or one or more computers (e.g., personal computer 104). The mobile device 102 of FIG. 1 may be depicted as a smartphone, but the systems, methods, routines and/or techniques of the present disclosure may work with other mobile devices (e.g., cell phones, tablets, PDA's, laptop computers, etc.) or other computers or data processing systems in general. Various descriptions herein may reference hardware, software, applications and the like of mobile devices; however, it should be understood that the descriptions may apply to other devices and/or other computers, for example, any device that may download and/or install an application and/or software program. Client devices 102, 104 may communicate with various servers (not shown), for example, application servers, to download applications, application packages, software programs, executables and/or the like. Client device 102, 104 may communicate with one or more verification services (e.g., verification service 106), for example, to communicate information related to applications, application packages, software programs, executables and/or the like to the verification service(s) for analysis. Client devices 102, 104 may receive verification responses from the verification service(s), for example, responses that indicate whether an application or software program may be undesirable (e.g., because it may contain malware).

Network setup 100 may include one or more verification services, for example, verification service 106. A verification service 106 may include various computers, servers, data stores, routers, switches, connections and other circuitry, devices, modules and the like. These various components of a verification service 106 may communicate and operate together to provide a unified verification service that various client devices can access. For example, a verification service may be accessible to a client at one or more known network addresses, for example, IP addresses. A verification service 106 may receive a verification request from a client device (e.g., client devices 102, 104). The verification service may use various pieces of information included in the request (e.g., a hash or other unique identifier related to the application package, various pieces of metadata and various other pieces of information) to determine whether an application and/or software program may be undesirable (e.g., because it may include malware). For example, a verification service may use information from a request such as a hash, the source URL from which an application package was downloaded, the source IP address, the URL of the referrer (e.g., a webpage that directed a user to a download page), the referrer IP address and optionally additional information.

A verification service 106 may perform various routines and/or comparisons, for example, between information included in or associated with a verification request and information included in one or more data stores of the verification service, to determine whether an application and/or software program may be undesirable (e.g., because it may include malware). For example, a verification service may maintain one or more lists and/or tables of hashes (or other unique identifiers) that are associated with known safe applications (e.g., a hash white list). As another example, a verification service may maintain one or more lists and/or tables of hashes (or other unique identifiers) that are associated with applications that are known to be undesirable (e.g., a hash black list). As another example, a verification service may maintain one or more lists and/or tables of source URLs and/or IP addresses that are known to provide safe applications (e.g., a source white list). As another example, a verification service may maintain one or more lists and/or tables of source URLs and/or IP addresses that are known to provide undesirable applications (e.g., a source black list). If a hash, URL, IP address or the like in a verification request matches a hash, URL, IP address or the like in one of white lists, a verification service may respond (e.g., to the requesting client device) that the application and/or software program is safe to install. If a hash, URL, IP address or the like in a verification request matches a hash, URL, IP address or the like in one of the black lists, a verification service may respond (e.g., to the requesting client device) that the application and/or application package should be prevented from installing. If a hash, URL, IP address or the like in a verification request matches no a hash, URL, IP address or the like in the data stores, a verification service may respond (e.g., to the requesting client device) that the application and/or software program may be undesirable (e.g., because it may include malware) and to proceed with caution.

In some embodiments, verification service 106 may perform various actions, tasks and/or routines when it encounters a piece of information (e.g., from a verification request) that was not included in its various data stores. For example, if a verification request includes a URL that was not previously included in a remote verification services's data stores, the verification service may attempt to download the application and/or software program from the URL to analyze the binary. After the application and/or software program has been analyzed, the verification service may store various pieces of information about the application and/or software program (e.g., a hash, source URL, etc.) as well as an indication of whether the application and/or software program appears to be safe, unsafe, or potentially unsafe.

In some embodiments, a verification service 106 may maintain one or more webs, networks or social graphs of information related to known undesirable applications and/or software programs, for example, known sources, authors, developers and/or distributors of malware. In this respect, a verification service 106 may detect potentially or likely undesirable applications even if information included in a verification request (e.g., hash URL, IP address, etc.) does not exactly match information in one of the data stores. A verification service 106 may place importance on various pieces of social data like the authors and/or common providers of undesirable applications, for example, instead of just known malware infested applications and their immediate sources. As one example, a verification service 106 may determine with a fairly high degree of confidence that an application downloaded from a first server likely includes malware if the first server commonly communicates with a second server that commonly provides applications that include malware. After referencing this disclosure, it will also become apparent that a verification service 106 could detect additional levels of separation (e.g., larger social networks and/or webs of ancestry data), for example, a first server that communicates with a second server that communicates with a third server. As another example, an application may include a process and/or routine (e.g., a botnet) that frequently communicates with a server (e.g., a command and control server) that is known to instruct and/or collect information from malware. As another example, based on several positive detections of malware sourced from several related IP addresses, a verification service 106 may designate an entire pool of IP addresses and suspect sources. An application may be determined to potentially include malware if the application was downloaded from an IP address within a suspect pool, or if the source of the application (e.g., a server) commonly communicated with servers within this suspect pool. A verification service 106 may maintain various other types of suspect information associations.

Figure 2:
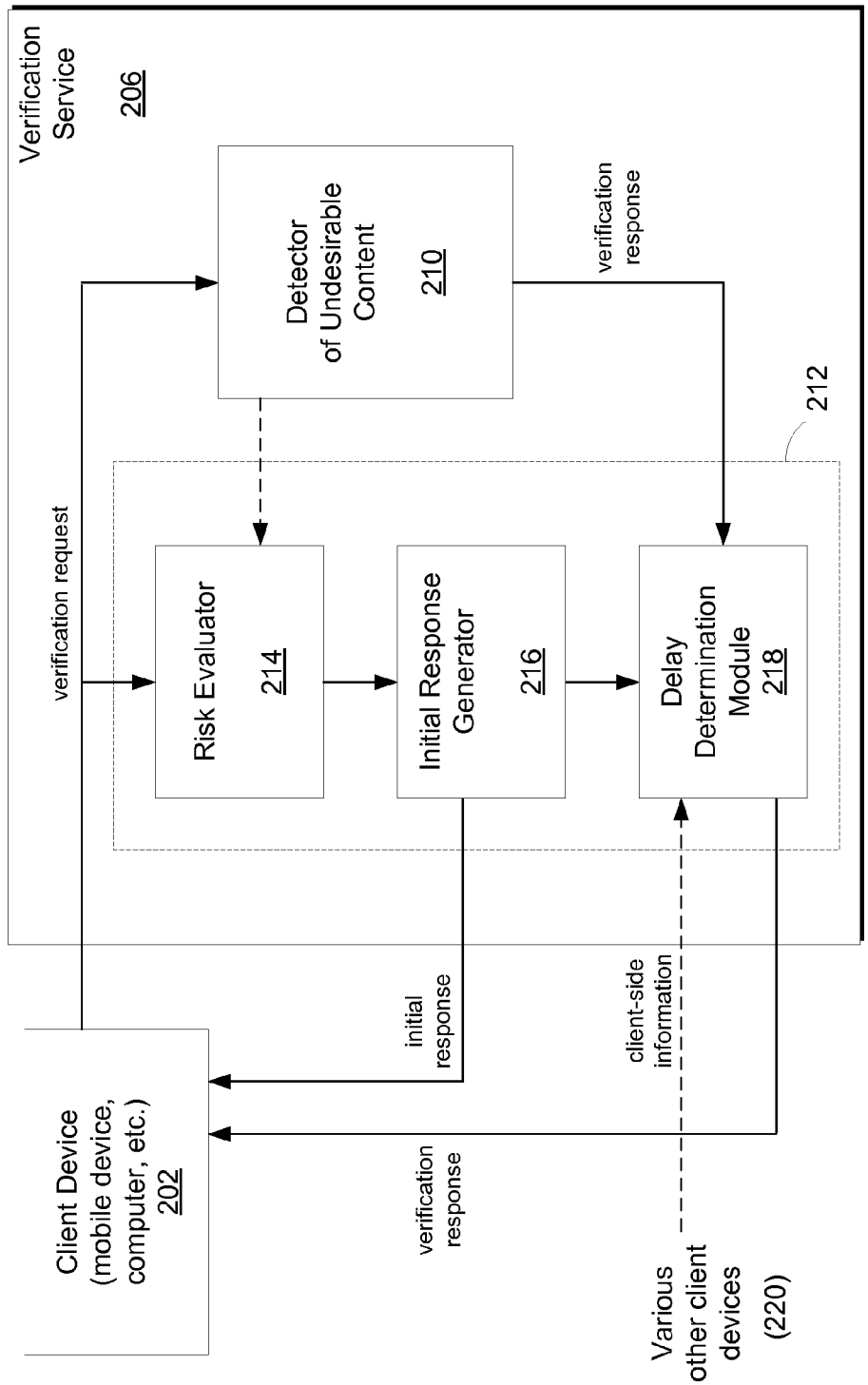
FIG. 2 depicts an illustration of a block diagram showing example components, routines, connections and interactions of a verification service, according to one or more embodiments of the present disclosure.

FIG. 2 depicts an illustration of a block diagram showing example components, routines, connections and interactions of a verification service 206, according to one or more embodiments of the present disclosure. Verification service 206 may be similar to the verification service 106 of FIG. 1, for example. A verification service 206 may receive a verification request from a client device 202. As explained above, the verification request may include various pieces of information (e.g., a hash or other unique identifier related to the application and/or software program and various pieces of metadata), and the verification service 206 may analyze this information (e.g., via a detector module 210) to determine whether an application and/or software program may be undesirable (e.g., because it may include malware). Thus, a detector module 210 may accept as input a verification request form a client device 202 and may output a verification response that indicates whether an application and/or software program may be undesirable. In the example of FIG. 2, the detector module 210 may generally represent the bulk of a verification service 206, for example, various data stores, checks, routines, algorithms and the like that are operable to determine whether an application and/or software program may be undesirable.

Client device 202 may be similar to one of the client devices (e.g., mobile device 102 or computer 104) of FIG. 1, for example. Client device 202 may communicate or submit a verification request to the verification service 206. For example, a user of a client device may voluntarily submit an application or software program to the verification service, for example, by a web interface, API or the like. As another example, the client device may include an application or software program manager service, and the manager service may submit (e.g., automatically) applications or software programs to the verification service when a user attempts to install the application or software program. After the client device 202 submits a verification request, the user of the client device may expect and/or wait for a verification response to indicate whether the application is potentially unsafe or undesirable. In some situations, a user of a client device may choose to install an application or software program before receiving a verification response. In such situations, the user may have been informed that it is advisable to wait for a verification response and the user may proceed at their own risk.

The verification service 206 may communicate the verification response to the client device 202 in various ways. For example, the verification service may send an email to an email account associated with the user of the client device. As another example, the verification service may send a text (SMS) message to the client device 202 or an associated telephone number of the user. As another example, if an application manager running on the client device 202 submitted the verification request (e.g., when the user attempted to install the application), the verification service may communicate the verification response back to the application manager and the application manager may cause a window or message to display on the screen of the client device 202. Various other methods of communicating the verification response to the client device and/or the associated user will become apparent after referencing this disclosure.

In some embodiments of the present disclosure, a verification service 206 may include a delay buffer 212. The term delay buffer may generally refer to one or more routines, modules or the like that may determine if and when a verification response (e.g., from a detector module 210) should be communicated to the client device 202. A delay buffer 212 may be useful to address various issues discussed regarding hackers that may attempt to use a verification service 206 "as an oracle." In these embodiments, instead of the verification service 206 returning a verification response to a client device 202 as soon as the verification response is ready (e.g., in real time or near real time), the verification service 206 may provide a time-delayed verification response, or, in some situations, may prevent the verification response from being returned to the client device 202. In the cases where a verification response is delayed (e.g., by 48 hours), it may become painfully slow and/or expensive for a hacker to utilize an adjustment and resubmit technique as explained above. Even though a delayed verification response may thwart hackers, innocent users of the verification service may still receive sufficient benefit. For example, many users may be able to wait for a period of time (e.g., 48 hours) before installing an application or software program, and many users may understand the benefit they will receive if they wait.

A delay buffer 212 may detect when a verification request is received by the verification service 206 from a client device 202. The delay buffer 212 may communicate an initial response to the client device 202, for example, indicating that a verification response will be ready within a period of time. The delay buffer 212 may perform various routines to determine when (e.g., an amount of delay before) a verification request should be communicated to the client device 202. The amount of delay may vary depending on various factors, as explained more herein. In some situations, the delay buffer 212 may determine that a verification response should not be sent to the client device 202. The delay buffer 212 may evaluate information related to the verification request to determine a level of risk associated with the verification request. The level of risk associated with a verification request may determine various actions taken by the delay buffer 212. For example, the level of risk may determine the initial response that is communicated to the client device 202. As another example, the level of risk may determine whether or not a verification response will be sent to the client device, and how long the verification service 206 will delay if a verification response is to be sent.

A delay buffer 212 may include a risk evaluator 214, an initial response generator 216 and a delay determination module 218. A risk evaluator 214 may analyze information about a verification request to determine a level of risk associated with the verification request. The risk evaluator 214 may output an indication of a level of risk associated with a verification request, and may output details about the risk determination and/or details about a verification request. In this respect, other modules (e.g., the initial response generator 216 and/or the delay determination module 218) of the delay buffer 212, may analyze not only the level of risk, but particular details about the risk determination in order to perform various routines.

The risk evaluator may analyze information produced by other modules and/or routines of the verification service 206, for example, in the detector module 210. For example, detector module 210 may include various routines that perform checks to determine whether an application and/or software program (e.g., related to a verification request) is new to the verification service 206. Whether or not an application and/or software program is new (i.e., never before analyzed by the detector module 210) may be a factor used by the risk evaluator 214 to determine a level of risk. As another example, detector module 210 may analyze various pieces of information or metadata (e.g., source URL, source IP address, etc.) related to the verification request to determine whether an application and/or software program may have come from a suspicious source. Whether or not an application and/or software program likely came from a suspicious source may be a factor used by the risk evaluator 214 to determine a level of risk. The risk evaluator 214 may use various other determinations made by modules and/or routines in the detector module 210.

The risk evaluator 214 may perform various other checks and/or routines on the verification request and/or information from the detector module 210 to determine a level of risk. For example, the risk evaluator 214 may include a routine that tracks and/or checks information about the submitter (e.g., a particular hardware/MAC address or IP address of a client device 202) of the verification request. As one example, if a particular client device submits several verification requests within a short period of time, the risk evaluator 214 may increase the level of risk associated with any verification requests that come from that same device. Although various descriptions herein may describe routines that may be included within the risk evaluator 214 and various routines that may be included within the detector module 210, it should be understood that in various embodiments, the routines may be included partially or wholly within either module. Furthermore, it should be understood that the boxes shown in verification service 206 of FIG. 2 are used to illustrate a conceptual breakdown, and are not intended to indicate any strict location of any routine and/or module.

As another example of a routine that may be performed by the risk evaluator 214, a time deterioration routine may lower the risk associated with a particular application as time passes since the first time the risk evaluator 214 saw the application, for example, eventually lowering the risk to zero if other risk factors appear acceptable. This time deterioration routine may be similar to a routine from the detector module 210 that determines whether the application (e.g., its binary, etc.) has been analyzed previously. However, this time deterioration routine may allow the risk evaluator 214 to lower the risk (e.g., to zero) even if the detector module 210 has not completed analyzing the application. As a specific example of a time deterioration routine, the verification service may receive a verification request related to an application that neither the risk evaluator 214 nor the detector module 210 has seen before. The detector module may begin to analyze the request/application, and the risk evaluator 214 may assign a high level of risk to the request. This high level of risk may cause the delay determination module 218 to determine that a maximum amount of delay should be used (e.g., 48 hours) before a verification response is returned to the client device

202. After a period of time (e.g., 24 hours), a request to verify the same application may be received by the verification service 206. The detector module 210 may have not yet reached a determination as to whether the application is safe or not. However, the risk evaluator 214 may lower the level of risk associated with the verification request because it saw the same application a while ago. This lower level of risk may cause the delay determination module 218 to determine that an intermediate amount of delay should be used (e.g., 24 hours). After a period of time (e.g., 24 more hours), a request to verify the same application may be received by the verification service 206. The detector module 210 may have not yet reached a determination as to whether the application is safe or not. However, the risk evaluator 214 may lower the level of risk (e.g., to zero) associated with the verification request because it saw the same application a while ago. This lower level of risk (e.g., zero) may cause the delay determination module 218 to determine that a minimum amount of delay (e.g., zero) should be used. In this respect, it can be seen that the first submission of an application to the verification service may experience a significant delay, and then subsequent submissions over time may experience a deteriorating delay. The idea may be that verification requests for the same application over time may not conform with the typical vision of a hacker performing an alteration and resubmission cycle. It should be understood that, in some examples, even though a time deterioration routine may indicate that the risk may be low or zero, other risk factors may still cause the risk evaluator 214 to assign a higher level of risk.

As another example of a routine that may be performed by the risk evaluator 214, a resubmission deterioration routine may lower the risk associated with a particular application as the risk evaluator 214 sees the same application over and over, for example, eventually lowering the risk to zero if other risk factors appear acceptable. As a specific example of a resubmission deterioration routine, the verification service may receive a verification request related to an application that neither the risk evaluator 214 nor the detector module 210 has seen before. The detector module may begin to analyze the request/application, and the risk evaluator 214 may assign a high level of risk to the request. This high level of risk may cause the delay determination module 218 to determine that a maximum amount of delay should be used before a verification response is returned to the client device 202. Later, a request to verify the same application may be received by the verification service 206. The detector module 210 may have not yet reached a determination as to whether the application is safe or not. However, the risk evaluator 214 may lower the level of risk associated with the verification request because it saw the same application previously. This lower level of risk may cause the delay determination module 218 to determine that an intermediate amount of delay should be used. Later, several more requests to verify the same application may be received by the verification service 206. The detector module 210 may have not yet reached a determination as to whether the application is safe or not. However, as the risk evaluator 214 see each subsequent submission of the same application, the risk evaluator 214 may lower the level of risk associated with the verification request because it saw the same application several times previously. This lower level of risk (e.g., to zero eventually) may cause the delay determination module 218 to determine that a minimum amount of delay (e.g., zero) should be used. In this respect, it can be seen that the first submission of an application to the verification service may experience a significant delay, and then subsequent submissions may experience a deteriorating delay based on the number of submission for the same application that came prior to the current submission. It should be understood that, in some examples, even though a resubmission deterioration routine may indicate that the risk may be low or zero, other risk factors may still cause the risk evaluator 214 to assign a higher level of risk.

As another example of a routine that may be performed by the risk evaluator 214, a consistency check routine may raise the risk associated with a particular application if details about the verification request and/or application do not appear to be consistent with known trends, patterns, compatibility issues and the like. For example, when a client device submits a verification request, various pieces of information or fields (e.g., via an API) may be filled out, for example, the type of device. The risk evaluator 214 (or the detector module 210) may run various consistency checks on information included in the request. As one specific example, the risk evaluator 214 may determine that a particular application would typically never be installed on a particular device, for example, due to compatibility issues. In this situation, such an uncommon installation situation may suggest that the user of the client device may be a hacker, for example, using the client device as a test device.

The risk evaluator 214 may receive information from various client devices (indicated generally by number 220). The various client devices 220 may communicate various pieces of client-side information to the verification service. The information from these various client devices is explained in more detail below in the description regarding the delay determination module 218. Although FIG. 2 shows client-side information being received by the delay determination module 218, in some embodiments, the risk evaluator 214 may use such information as a factor in determining a level of risk associated with a verification request. For example, a client device 220 may inform the verification service when a particular application has been installed. If the delay risk evaluator 214 sees that multiple client devices 220 are installing the same application that is related to a pending verification request/response, the risk evaluator 214 may determine that the level of risk associated with the verification response should be lower.

An initial response generator 216 may generate and communicate an initial response to a client device 202 that submitted a verification request. The content of an initial response may depend on the level of risk (and details about the risk determination) related to the verification request as determined by the risk evaluator 214, and various initial responses may be intended to serve various purposes. For example, if the verification request appears to have a low level of risk (e.g., below a particular threshold), for example, a request coming from a suspected innocent user, an initial response may indicate to the client device/that a verification response will not be ready for a period of time. In this situation, a period of delay may thwart a hacker who appears to be an innocent user, for example, by making an alteration and resubmit technique painfully slow and/or costly. The period of delay may also impose a minimal amount of inconvenience on an innocent user. The period of delay may also protect the entity in charge of running the verification service, for example, because the verification service may refrain from indicating to the user that the application is safe, instead suggesting that the user wait for the verification response.

As another example, if the verification request appears to have a higher level of risk (e.g., above a particular threshold), for example, a request coming from a suspected hacker, an initial response may be intended discourage a user from submitting similar applications, for example, by indicating to the user that an error occurred with the submission. In these examples, it may be the case that the detector module actually encountered no error when analyzing the verification request. In this respect, the initial response may include a misleading message; however, if a hacker continually encounters and error message (the initial response) when attempting to submit applications to the verification service 206, the hacker may abandon its alteration and resubmit tactics.

As another example, if the verification request appears to have a higher level of risk (e.g., above a particular threshold), for example, a request coming from a suspected hacker, an initial response may be intended encourage a user to proceed with the installation and/or distribution of the application, for example, such that the verification service can gather more information about the application, the hacker, the hacker's device and the like. In these examples, the initial response may indicate to the user that the application is safe, for example, even if the detector module 210 determines otherwise. In this respect, the initial response may include a misleading message; however, it may be understood that if a hacker receives a "safe" verification response from the verification service, the hacker may proceed with installing the application and/or distributing the application in various ways. For example, a hacker may install the application using an application manager service. As another example, a hacker may submit the application to an app store (e.g., Google Play, etc.) or the hacker may attempt to purchase web advertisements (e.g., Google Ads) to promote the application. In some situations, various services (e.g., app manager, app store, web ads, etc.) used by the hacker to install and/or distribute the application may be maintained and operated by the same entity that maintains and operates the verification service 206. In these situations, the verification service may be able to acquire information (e.g., from account information and/or financial information from these other services) about the hacker, the device, the application, etc. In this respect, the verification service may become more equipped to prevent verification requests from devices, services, and the like that are associated with this hacker.

It should be understood that various embodiments of the present disclosure may include various settings and/or options that protect the privacy of users, developers and the like. For example, a user may choose a setting that makes a device and/or the user anonymous when a verification request is communicated from to a verification service. As another example, a user that may maintain accounts with various services (e.g., app store, web ads, etc.) may set various settings and/or options to prevent the sharing of information between services.

Figure 3A:
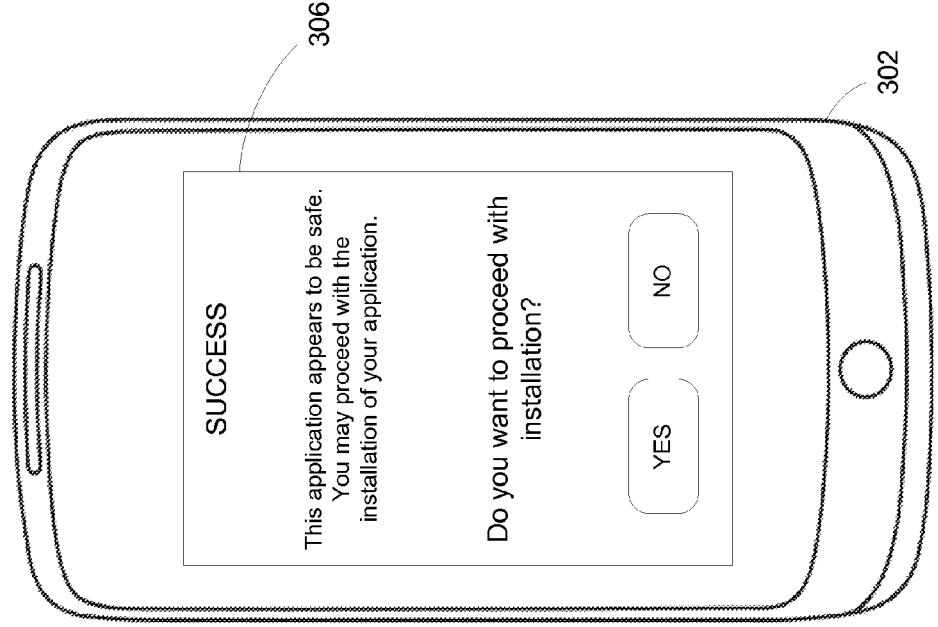
FIG. 3A depicts an illustration of an example client device that is displaying an example message, for example, an initial response message, according to one or more embodiments of the present disclosure.
Figure 3B:
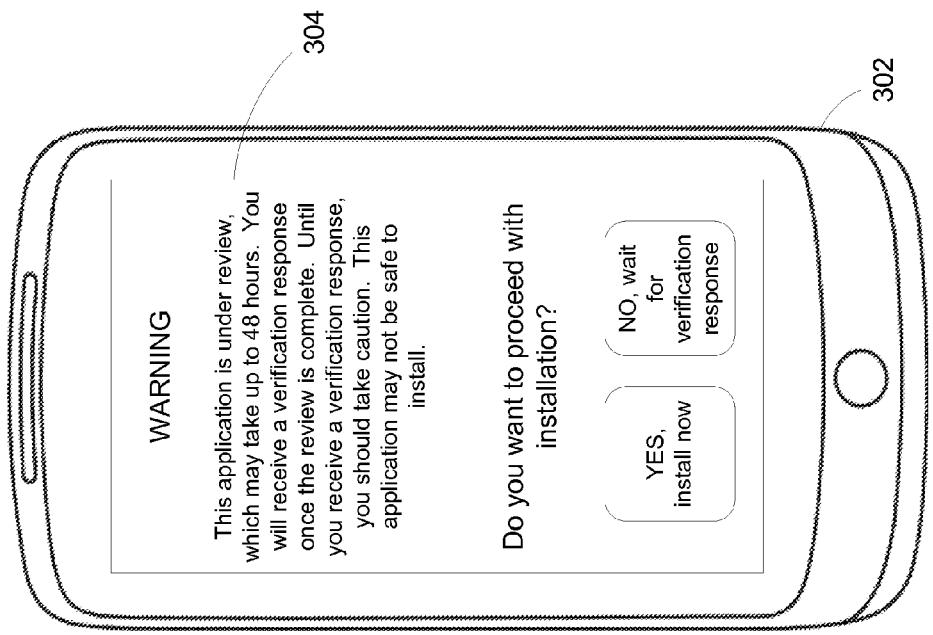
FIG. 3B depicts an illustration of an example client device that is displaying an example message, for example, an initial response message, according to one or more embodiments of the present disclosure.

FIGS. 3A and 3B depict illustrations of example client devices that are displaying example messages, for example, messages that may be communicated as an initial response by a verification service to a client device, according to one or more embodiments of the present disclosure. FIG. 3A depicts an example client device 302 that is displaying an example initial response message 304. A verification service may communicate the initial response message 304 to a client device 302, for example, if the verification service determined that the risk of the associated verification request was low (e.g., a suspected innocent user) and this was the first time the verification service (e.g., the risk evaluator) had seen this particular application. In this situation, the message may read similar to the following: "This application is under review, which may take up to 48 hours. You will receive a verification response once the review is complete. Until you receive a verification response, you should take caution. This application may not be safe to install. Do you want to proceed with installation?" The user device 302 may then display buttons or options to the user, such as "Yes, install now" or "No, wait for verification response". In some embodiments, when the initial response is communicated to the client device 302, the message 304 (or a related message) may display a prompt to the user to enter an email address, a telephone number for a text message, or other way to communicate with the user. The email address, phone number for a text message and the like may be used by the verification service to communicate the verification response if and when the verification service determines that the verification response should be communicated to the client device. In these situations, message 304 (or a related message) may include text that reads similar to the following: "Please enter an email address so we can email you with the verification response when it is ready."

FIG. 3B depicts an example client device 302 that is displaying an example initial response message 306. A verification service may communicate the initial response message 306 to a client device 302, for example, if the verification service determined that the risk of the associated verification request was high (e.g., a suspected hacker) and if the verification service determined that the purpose of the initial response is to encourage a suspected hacker to proceed with installing and/or distributing the application, for example, such that the verification service can gather more information about the application, the hacker, the hacker's device and the like. In this situation, the message may read similar to the following: "This application appears to be safe. You may proceed with the installation of your application. Do you want to proceed with installation?" The user device 302 may then display buttons or options to the user, such as "Yes" or "No." Various other initial response messages (e.g., other than just message 304 and message 306) will become apparent after referencing this disclosure, for example, message appropriate for various situations where the verification service determines various levels of risk associated with a verification request.

Referring again to FIG. 2, a delay determination module 218 may perform various routines to determine when, if at all, a verification request should be communicated to the client device 202. Whether or not a verification response should be sent and/or how long the verification service should delay before sending the verification response may depend on various factors, for example, the level of risk related to the verification request as determined by the risk evaluator 214. The amount of delay used may vary depending on various factors, for example, the level of risk related to the verification request. For example, if the level of risk associated with a verification request is low (e.g., a suspected innocent user), the delay determination module 218 may set the delay at a low level. As another example, if the level of risk associated with a verification request is at an intermediate level, the delay determination module 218 may set the delay at an intermediate level. As another example, if the level of risk associated with a verification request is high (e.g., a suspected hacker), the delay determination module 218 may set the delay at a high level. As another example, if the level of risk associated with a verification request is intermediate or high (e.g., a suspected hacker), the delay determination module 218 may determine that the verification request should not be sent at all. In various embodiments, various levels of delay may be used. For example, a minimum level of delay may be set, for example, at zero. As another example, an intermediate level of delay may be set, for example, at 24 hours. As another example, the highest level of delay may be set, for example, at 48 hours. In some embodiments, the amount of delay used by the delay determination module 218 may range at any level between the minimum and the maximum amount of delay, and the level may change as the level of risk changes.

A delay determination module 218 may receive information from various client devices (indicated generally by number 220). These client devices 220 may be different than the client device 202, but client devices 220 may be in communication with the verification service 206 in a similarly to how the client device 202 is in communication with the verification service 206. The various client devices 220 may communicate various pieces of client-side information to the verification service. For example, a client device 220 may inform the verification service when a particular application has been installed. For example, some client devices may use an application manager service (e.g., a service maintained by the same entity that maintains the verification service 206) to install applications. The application manager service may send an indication to the verification service 206 when an application (or optionally just particular applications) is installed. The delay determination module 218 may use client-side information from various client devices 220 to determine when and if a particular verification response should be communicated to a client device 202. For example, if the delay determination module 218 sees that multiple client devices 220 are installing the same application that is related to a pending verification request/response, the delay determination module 218 may determine that the verification response should be sent. As another example, if certain types of applications or malware are known to generally infect particular types of client devices, the delay determination module 218 may wait to send the verification response until it sees that the same application has been installed on multiple client devices 220 of that particular type. In some embodiments, the delay determination module may use installation information from various client devices 220 as a trigger to determine when and if verification responses related to particular applications should be sent to a client device. For example, even if other checks and routines performed in the delay buffer 212 indicate that a verification response can be sent, the delay determination module 218 may prevent sending the verification response until it sees sufficient installation information from client devices 220. In some embodiments, the delay determination module 218 may wait for installation information from client devices 220 even if such information is not seen for days, weeks or months.

Certain embodiments of the present disclosure may be found in one or more methods for time delay on services that detect undesirable content. With respect to the various methods described herein and depicted in associated figures, it should be understood that, in some embodiments, one or more of the steps described and/or depicted may be performed in a different order. Additionally, in some embodiments, a method may include more or less steps than are described and/or depicted.

FIG. 4 depicts a flow diagram 400 that shows example steps in a method for time delay on services that detect undesirable content, in accordance with one or more embodiments of the present disclosure. At step 402, a verification service may receive a verification request, for example, from a client device. At step 404, the verification service may analyze the verification request (e.g., using various data stores, checks, routines, algorithms and the like) to determine whether an application associated with the verification request may be undesirable (e.g., because it may contain malware). The verification service may generate a verification response that indicates whether the application may be undesirable. At step 406, the verification service (e.g., a risk evaluator) may determine a level of risk associated with the verification request.

The verification service may user various routines, techniques and the like to evaluate risk, as explained in detail herein. At step 408, the verification service (e.g., an initial response generator) may formulate and/or communicate an initial response to the client device. The content of the initial response may take various forms, for example, depending on the determination of the level of risk, as explained in detail herein. At step 410, the verification service (e.g., a delay determination module) may determine whether the verification response should be communicated to the client device at all. The verification service may make this determination based on the risk determination performed at step 406, including details of the risk determination. At step 412, if the verification response will be sent to the client device, the verification service (e.g., a delay determination module) may determine whether a delay should be imposed before the verification response is communicated. Additionally, the amount of delay may be determined at step 412. The verification service may make these delay determinations based on the risk determination performed at step 406, including details of the risk determination. At step 414, the verification response may be communicated to the client device, for example, via email, text message or other communication method. The verification response may be communicated after a delay is imposed, as determined at step 412.

Various embodiments of the present disclosure describe one or more systems, methods, routines and/or techniques for time delay on services that detect undesirable content. In one or more embodiments, a method may be executed on a data processing system, computer, mobile device, smartphone or the like. The method may include receiving a verification request from a first client device, wherein the verification request may include information about a software program. The method may include analyzing the verification request to determine whether the software program may be undesirable. The method may include generating a verification response that indicates whether the software program may be undesirable. The method may include analyzing the verification request to determine a level of risk associated with the verification request. The method may include transmitting the verification response to the first client device. The method may include delaying for a period of time after receiving the verification request and before transmitting the verification response, wherein the period of time may depend on the level of risk. The method may include transmitting, to the first client device, an initial response that indicates that the verification response will be sent after a period of time. The initial response may depend on the level of risk. The level of risk may depend on whether the data processing system received a previous verification request that included information about the software program. The level of risk may lower as time passes since the first time the data processing system receives a previous verification request that includes information about the software program. The level of risk may lower as the number of times the data processing system receives previous verification requests that include information about the software program increases. In some embodiments, the method may include receiving one or more reports from one or more second client devices that indicate that the software program has been installed on the respective one or more second client devices. The period of time may depend on whether the software program has been installed on one or more of the second client devices. In some embodiments, the verification response may be transmitted to the first client device via email or text message.

In one or more embodiments of the present disclosure, a method may be executed on a data processing system, computer, mobile device, smartphone or the like. The method may include receiving a verification request from a client device, wherein the verification request may include information about a software program. The method may include analyzing the verification request to determine whether the software program may be undesirable. The method may include generating a verification response that indicates whether the software program may be undesirable. The method may include analyzing the verification request to determine a level of risk associated with the verification request. If the level of risk is above a threshold, the method may include refraining from transmitting the verification response to the client device, and transmitting a misleading message to the client device. The misleading message may indicate that the software program is safe. The misleading message may indicate that an analysis of the software program cannot be completed due to an error. The level of risk may depend on whether the data processing system received a previous verification request that included information about the software program. The level of risk may lower as time passes since the first time the data processing system receives a previous verification request that includes information about the software program. The level of risk may lower as the number of times the data processing system receives previous verification requests that include information about the software program increases. The level of risk may depend on whether the software program has been analyzed, previous to the verification request, to determine whether the software program may be undesirable. The level of risk may depend on whether the previous analysis determined that the software program likely came from a suspicious source.

One or more embodiments of the present disclosure describe a data processing system that includes one or more memory units that store computer code and one or more processor units coupled to the one or more memory units. The one or more processor units may execute the computer code stored in the one or more memory units to receive a verification request from a client device, wherein the verification request may include information about a software program. The one or more processor units may execute the computer code stored in the one or more memory units to analyze the verification request to determine whether the software program may be undesirable. The one or more processor units may execute the computer code stored in the one or more memory units to generate a verification response that indicates whether the software program may be undesirable. The one or more processor units may execute the computer code stored in the one or more memory units to analyze the verification request to determine a level of risk associated with the verification request. The one or more processor units may execute the computer code stored in the one or more memory units to transmit the verification response to the client device. The one or more processor units may execute the computer code stored in the one or more memory units to delay for a period of time after receiving the verification request and before transmitting the verification response, wherein the period of time may depend on the level of risk. The one or more processor units may execute the computer code stored in the one or more memory units to transmit, to the client device, an initial response that indicates that the verification response will be sent after a period of time, wherein the initial response may depend on the level of risk. The level of risk may depend on whether the data processing system received a previous verification request that included information about the software program. The level of risk may lower as time passes since the first time the data processing system receives a previous verification request that includes information about the software program. The level of risk may depend on whether the data processing system received a previous verification request that included information about the software program. The level of risk may lower as the number of times the data processing system receives previous verification requests that include information about the software program increases.

The methods, routines and solutions of the present disclosure, including the example methods and routines illustrated in the flowcharts and block diagrams of the different depicted embodiments may be implemented as software executed by a data processing system that is programmed such that the data processing system is adapted to perform and/or execute the methods, routines, techniques and solutions described herein. Each block or symbol in a block diagram or flowchart diagram referenced herein may represent a module, segment or portion of computer usable or readable program code which comprises one or more executable instructions for implementing, by one or more data processing systems, the specified function or functions. In some alternative implementations of the present disclosure, the function or functions illustrated in the blocks or symbols of a block diagram or flowchart may occur out of the order noted in the figures. For example in some cases two blocks or symbols shown in succession may be executed substantially concurrently or the blocks may sometimes be executed in the reverse order depending upon the functionality involved. Part or all of the computer code may be loaded into the memory of a data processing system before the data processing system executes the code.

Figure 5:
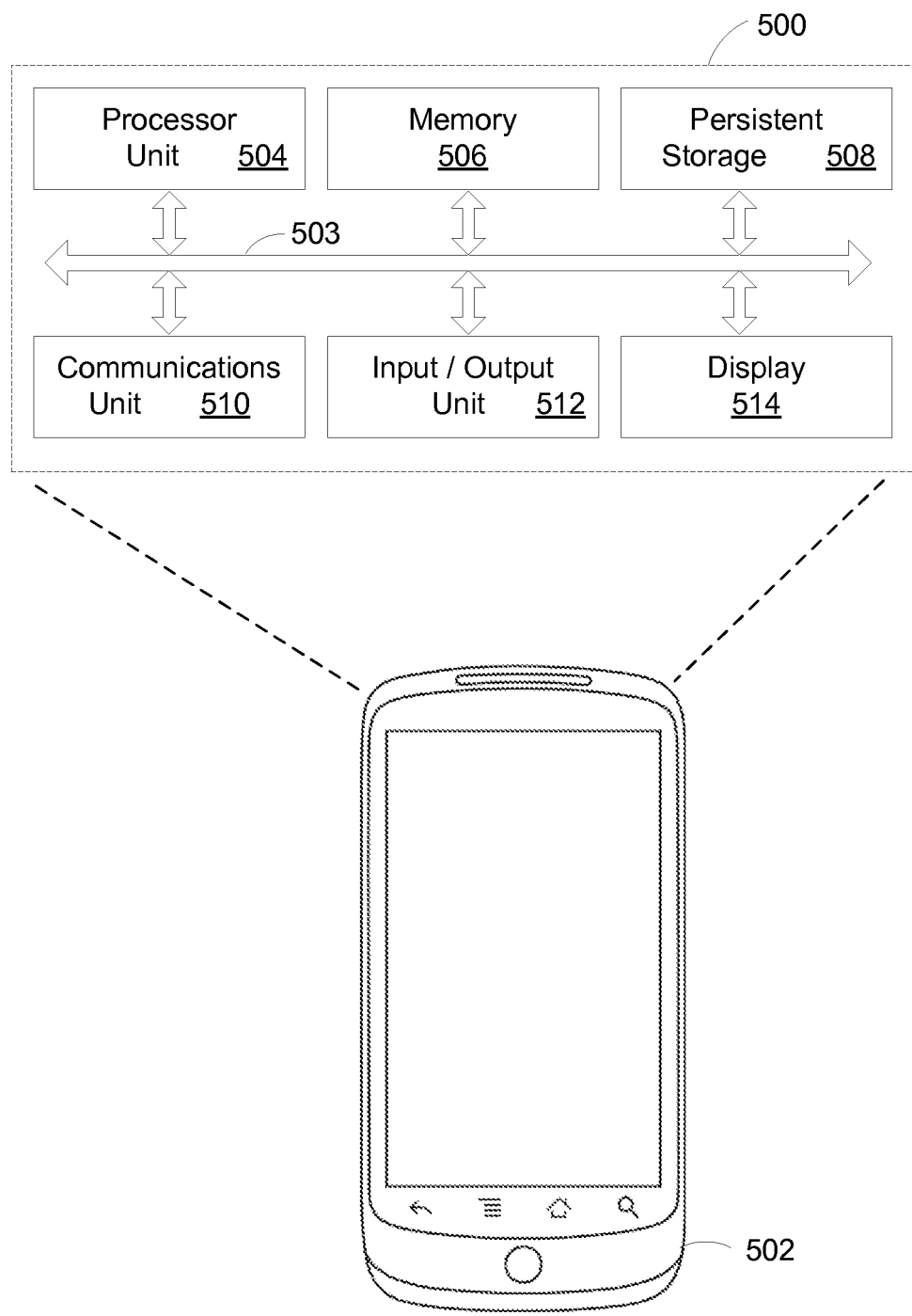
FIG. 5 depicts a block diagram of an example data processing system that may be included within a mobile device or smartphone, according to one or more embodiments of the present disclosure.

FIG. 5 depicts a block diagram of an example data processing system 500 that may be included within a mobile device 502 or smartphone, according to one or more embodiments of the present disclosure. The data processing system 500 may be used to execute, either partially or wholly, one or more of the methods, routines and/or solutions of the present disclosure. In some embodiments of the present disclosure, more than one data processing system, for example data processing systems similar to data processing system 500, may be used to implement the methods, routines, techniques and/or solutions described herein. In the example of FIG. 5, data processing system 500 may include a communications fabric 503 which provides communications between components, for example a processor unit 504, a memory 506, a persistent storage 508, a communications unit 510, an input/output (I/O) unit 512 and a display 514. A bus system may be used to implement communications fabric 502 and may be comprised of one or more buses such as a system bus or an input/output bus. The bus system may be implemented using any suitable type of architecture that provides for a transfer of data between different components or devices attached to the bus system.

Processor unit 504 may serve to execute instructions (for example, a software program, an application, native OS code and the like) that may be loaded into the data processing system 500, for example, into memory 506. Processor unit 504 may be a set of one or more processors or may be a multiprocessor core depending on the particular implementation. Processor unit 504 may be implemented using one or more heterogeneous processor systems in which a main processor is present with secondary processors on a single chip. As another illustrative example, processor unit 504 may be a symmetric multi-processor system containing multiple processors of the same type.

Memory 506 may be, for example, a random access memory or any other suitable volatile or nonvolatile storage device. Memory 506 may include one or more layers of cache memory. Persistent storage 508 may take various forms depending on the particular implementation. For example, persistent storage 508 may contain one or more components or devices. For example, persistent storage 508 may be a hard drive, a solid-state drive, a flash memory or some combination of the above.

Instructions for an operating system may be located on persistent storage 508. In one specific embodiment, the operating system may be some version of a number of known operating systems for mobile devices or smartphones (e.g, Android, iOS, etc.). Instructions for applications and/or programs may also be located on persistent storage 508. These instructions may be loaded into memory 506 for execution by processor unit 504. For example, the methods and/or processes of the different embodiments described in this disclosure may be performed by processor unit 504 using computer implemented instructions which may be loaded into a memory such as memory 506. These instructions are referred to as program code, computer usable program code or computer readable program code that may be read and executed by a processor in processor unit 504.

Display 514 may provide a mechanism to display information to a user, for example, via a LCD or LED screen or monitor, or other type of display. It should be understood, throughout this disclosure, that the term "display" may be used in a flexible manner to refer to either a physical display such as a physical screen, or to the image that a user sees on the screen of a physical device. Input/output (I/O) unit 512 allows for input and output of data with other devices that may be connected to data processing system 500. Input/output devices can be coupled to the system either directly or through intervening I/O controllers.

Communications unit 510 may provide for communications with other data processing systems or devices, for example, via one or more networks. Communications unit 510 may be a network interface card. Communications unit 510 may provide communications through the use of wired and/or wireless communications links. In some embodiments, the communications unit may include circuitry that is operable to communicate according to various wireless communication standards, for example, cellular standards, WIFI standards, BlueTooth standards and the like.

The different components illustrated for data processing system 500 are not meant to provide architectural limitations to the manner in which different embodiments may be implemented. The different illustrative embodiments may be implemented in a data processing system including components in addition to or in place of those illustrated for data processing system 500. Other components shown in FIG. 5 can be varied from the illustrative examples shown.

The description of the different advantageous embodiments has been presented for purposes of illustration and the description and is not intended to be exhaustive or limited to the embodiments in the form disclosed. Many modifications and variations will be apparent to those of ordinary skill in the art. Further different advantageous embodiments may provide different advantages as compared to other advantageous embodiments. The embodiment or embodiments selected are chosen and described in order to best explain the principles of the embodiments of the practical application and to enable others of ordinary skill in the art to understand the disclosure for various embodiments with various modifications as are suited to the particular use contemplated.

The invention claimed is:

1. A method executed by a data processing system having at least one processor, the method comprising:
receiving a verification request from a first client device, wherein the verification request includes information about a software program;
analyzing the verification request to determine whether the software program may be malicious;
generating a verification response that indicates whether the software program may be malicious;
analyzing the verification request to determine a level of risk associated with the verification request;
if the level of risk is above a threshold:
refraining from transmitting the verification response to the client device; and
transmitting a misleading message to the client device;
if the level of risk is not above the threshold:
transmitting the verification response to the first client device; and
delaying for a period of time after receiving the verification request and before transmitting the verification response, wherein the period of time depends on the level of risk.

2. The method of claim 1, further comprising transmitting, to the first client device, an initial response that indicates that the verification response will be sent after a period of time.

3. The method of claim 2, wherein the initial response depends on the level of risk.

4. The method of claim 1, wherein the level of risk depends on whether the data processing system received a previous verification request that included information about the software program.

5. The method of claim 4, wherein the level of risk lowers as time passes since the first time the data processing system receives a previous verification request that includes information about the software program.

6. The method of claim 4, wherein the level of risk lowers as the number of times the data processing system receives previous verification requests that include information about the software program increases.

7. The method of claim 1, further comprising receiving one or more reports from one or more second client devices that indicate that the software program has been installed on the respective one or more second client devices, wherein the period of time may depend on whether the software program has been installed on one or more of the second client devices.

8. The method of claim 1, wherein the verification response is transmitted to the first client device via email or text message.

9. A method executed by a data processing system having at least one processor, the method comprising:
receiving a verification request from a client device, wherein the verification request includes information about a software program;
analyzing the verification request to determine whether the software program may be malicious;
generating a verification response that indicates whether the software program may be malicious;
analyzing the verification request to determine a level of risk associated with the verification request; and
if the level of risk is above a threshold:
refraining from transmitting the verification response to the client device; and
transmitting a misleading message to the client device.

10. The method of claim 9, wherein the misleading message indicates that the software program is safe.

11. The method of claim 9, wherein the misleading message indicates that an analysis of the software program cannot be completed due to an error.

12. The method of claim 9, wherein the level of risk depends on whether the data processing system received a previous verification request that included information about the software program.

13. The method of claim 12, wherein the level of risk lowers as time passes since the first time the data processing system receives a previous verification request that includes information about the software program.

14. The method of claim 12, wherein the level of risk lowers as the number of times the data processing system receives previous verification requests that include information about the software program increases.

15. The method of claim 9, wherein the level of risk depends on whether the software program has been analyzed, previous to the verification request, to determine whether the software program may be malicious.

16. The method of claim 15, wherein the level of risk depends on whether the previous analysis determined that the software program likely came from a suspicious source.

17. A data processing system, comprising:
one or more memory units that store computer code; and
one or more processor units coupled to the one or more memory units, wherein the one or more processor units execute the computer code stored in the one or more memory units to:
receive a verification request from a client device, wherein the verification request includes information about a software program;
analyze the verification request to determine whether the software program may be malicious;
generate a verification response that indicates whether the software program may be malicious;
analyze the verification request to determine a level of risk associated with the verification request;
if the level of risk is above a threshold:
refrain from transmitting the verification response to the client device; and
transmit a misleading message to the client device;
if the level of risk is not above the threshold:
transmit the verification response to the client device; and
delay for a period of time after receiving the verification request and before transmitting the verification response, wherein the period of time depends on the level of risk.

18. The data processing system of claim 17, wherein the one or more processor units execute the computer code stored in the one or more memory units to transmit, to the client device, an initial response that indicates that the verification response will be sent after a period of time, wherein the initial response depends on the level of risk.

19. The method of claim 17, wherein the level of risk depends on whether the data processing system received a previous verification request that included information about the software program, wherein the level of risk lowers as time passes since the first time the data processing system receives a previous verification request that includes information about the software program.

20. The method of claim 17, wherein the level of risk depends on whether the data processing system received a previous verification request that included information about the software program, wherein the level of risk lowers as the number of times the data processing system receives previous verification requests that include information about the software program increases.

21. The method of claim 1, wherein the software program is determined to be malicious based upon the presence of at least one type of content selected from the group consisting of: malware, pirated content, and counterfeit content.

22. The method of claim 9, wherein the software program is determined to be malicious based upon the presence of at least one type of content selected from the group consisting of: malware, pirated content, and counterfeit content.

23. The data processing system of claim 17, wherein the one or more processor units execute the computer code stored in the one or more memory units to determine that the software program is malicious based upon the presence of at least one type of content selected from the group consisting of: malware, pirated content, and counterfeit content.

* * * * *